J. G. JONES.
DEVICE FOR USE IN COOKING AND SLICING HAMS AND OTHER MEATS.
APPLICATION FILED APR. 28, 1920.
1,431,234.
Patented Oct. 10, 1922.
4 SHEETS—SHEET 1.
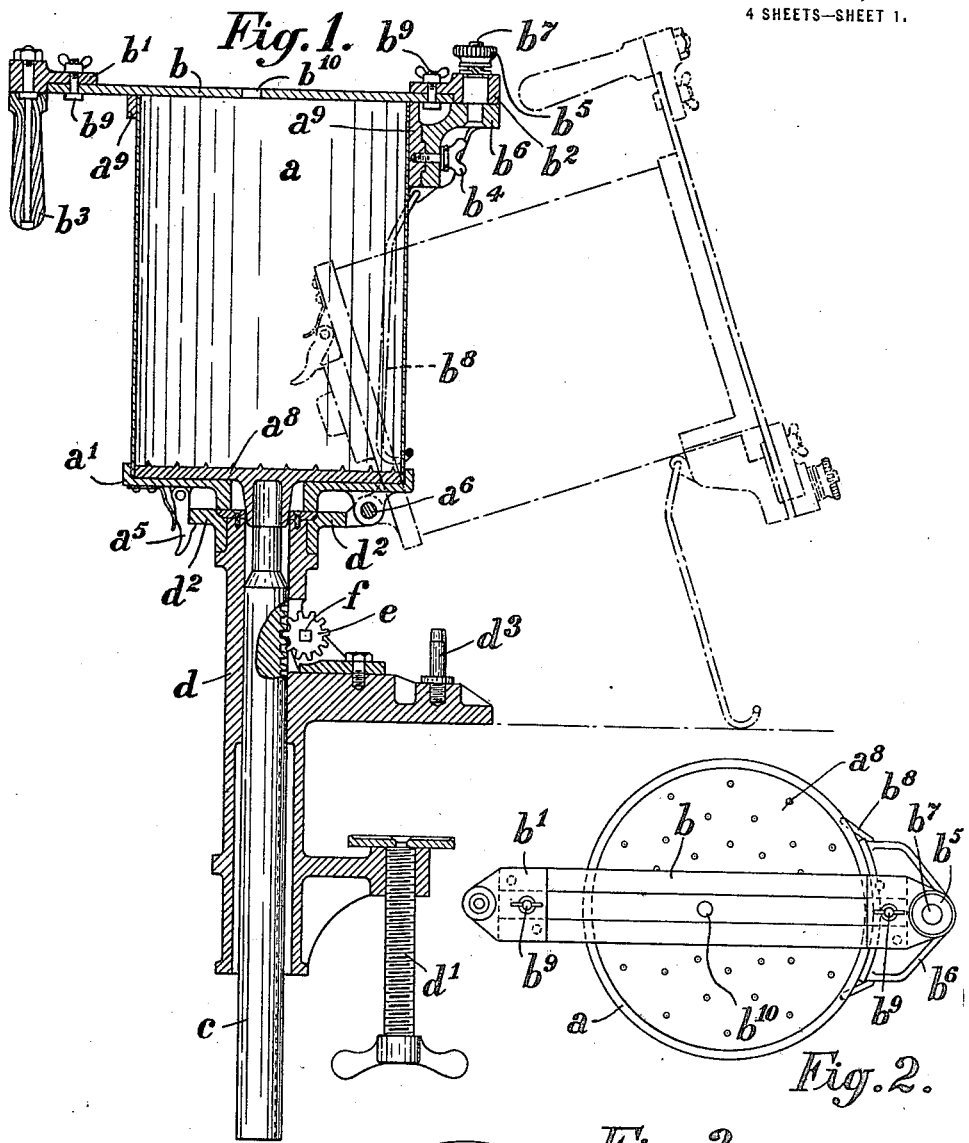
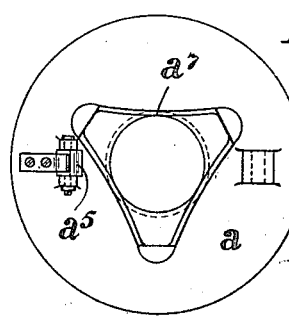
Inventor
John George Jones
Associate Attorneys.

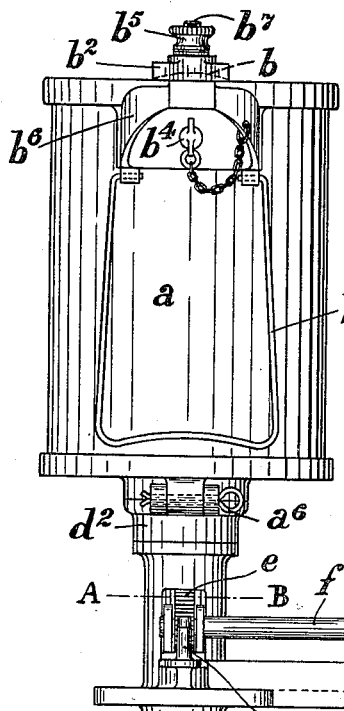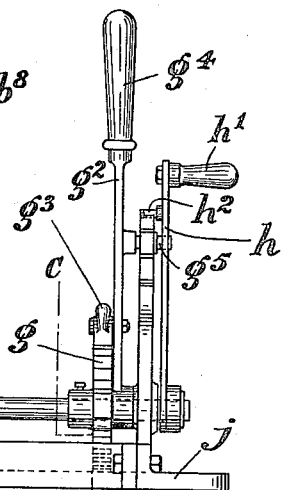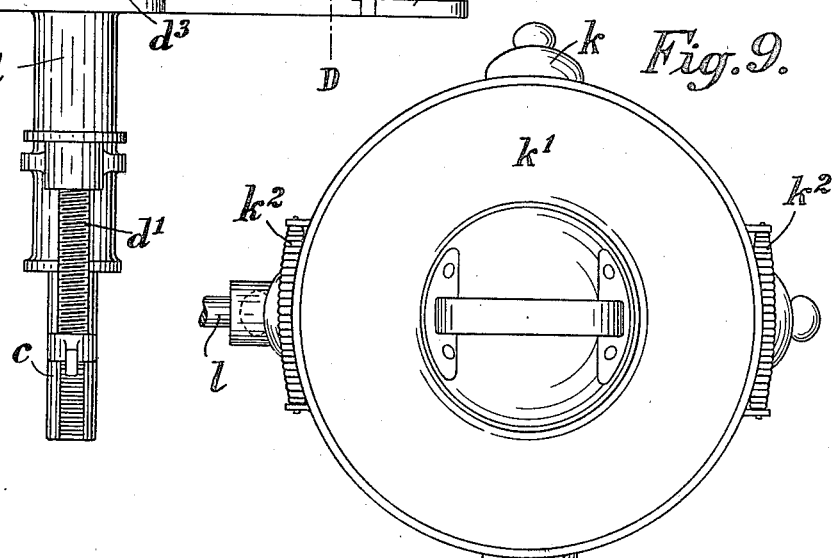

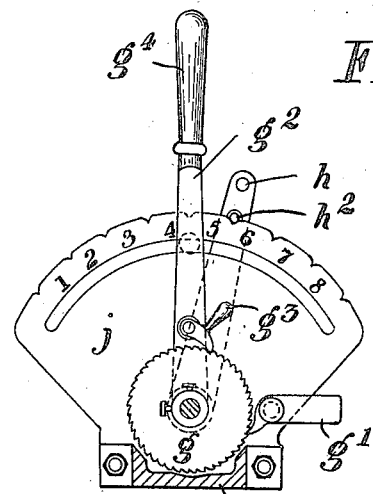
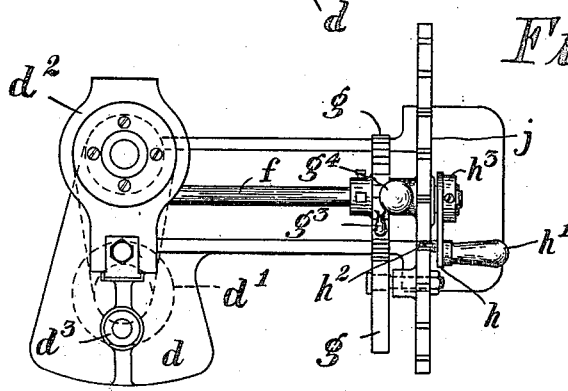
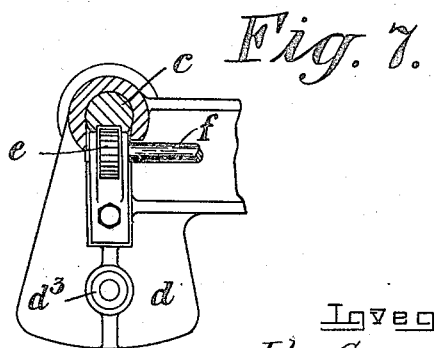

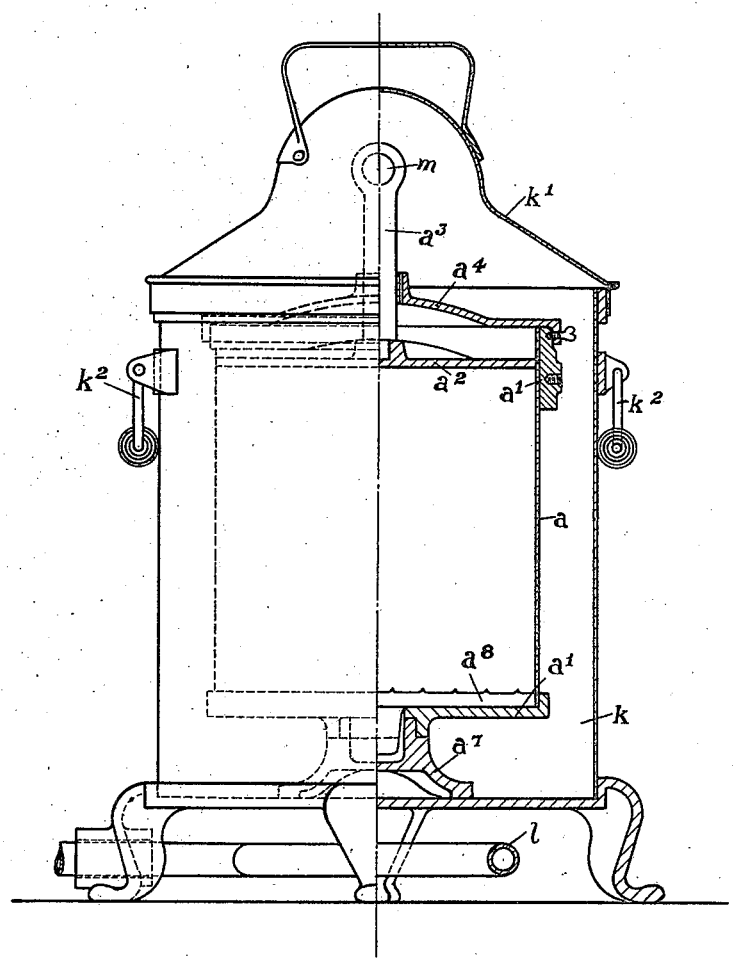

Patented Oct. 10, 1922.

1,431,234

UNITED STATES PATENT OFFICE.

JOHN GEORGE JONES, OF SHOTTON, NEAR CHESTER, WALES, ASSIGNOR TO SCIENTIFIC COOKING DEVICES LIMITED, OF CHESTER, ENGLAND.

DEVICE FOR USE IN COOKING AND SLICING HAMS AND OTHER MEATS.

Application filed April 28, 1920. Serial No. 377,363.

(GRANTED UNDER THE PROVISIONS OF THE ACT OF MARCH 3, 1921, 41 STAT. L., 1313.)

*To all whom it may concern:*

Be it known that I, JOHN GEORGE JONES, subject of the King of Great Britain, residing at Shotton, near Chester, in the county of Flint, Wales, have invented certain new and useful Improvements in Devices for Use in Cooking and Slicing Hams and Other Meats, of which the following is a specification.

Prior to this invention the usual method of preparing ham for sale in slices consists in the first place in removing the ham bone, rolling the ham, and enclosing it in a holder which binds the meat together during the boiling or cooking and prevents the meat juices and fat being lost, and in the second place removing the ham from the holder after cooking and placing it in a separate machine to slice off pieces of the desired thickness. Some of these holders comprised body sections of sheet metal which was rolled up to form an enclosing cylinder but which could be opened to allow the ham to be removed, others again consisted of containers having a plate supported by a fixed bottom through which an ejecting rod could be passed to eject the plate and the ham from the other end of the container, the ham after ejectment being subsequently cut up. The work of removing the holder from the ham, or ejecting the ham from the container consumed a good heal of time and furthermore the meat had to be handled when removing it from the holder and placing it on a plate or in the machine for cutting off slices. Another method was to provide jars or receptacles to receive and preserve the meat which was cooked previous to inserting it in such jars or receptacles, the said jars or receptacles being provided with a plate supported by a fixed bottom through which an ejecting rod or a screwed spindle was passed to force the ham out of the mouth of the receptacle the necessary distance to permit of the desired quantity of such ham to be cut off. By this method also the work of packing the jar or receptacle with the meat previously cooked consumed a good deal of time and necessitated handling of the meat.

Now the present invention is designed to provide a compact apparatus for cooking the meat and for cutting it up into slices, the arrangement being such as to absolutely avoid the hands coming into contact with the meat at all in the interval between placing the raw meat in the holder for cooking, and the production of the sliced up cooked pieces.

For the purpose of carrying my invention into practical effect a meat holder is provided comprising a body with a permanent bottom and removable lid, within which body the meat is compressed, the said body having a reinforcing member permanently attached at one end to which the bracket of a pivoted slicing knife can be removably attached in such manner that the knife will operate in a plane at right angles to the axis of the meat holder. A false bottom fits the interior of the holder at the other end upon which the meat rests, and means are provided for forcing this false bottom axially along the interior of the vessel so as to cause the meat to protrude a definite distance at the slicing knife end between each slicing operation. The apparatus includes also a cooking receptacle in which the meat packed in its holder is placed and where it remains for a suitable length of time until the cooking operation is completed, and it also includes a stand upon which the meat holder is placed when its cooked contents are required for use. By operating a handle arranged in connection with this stand the meat is protruded from the holder a definite distance, and by operating a handle arranged in connection with the knife, a slice is cut off from the meat so protruded.

The invention will be understood from the following description reference being had to the accompanying drawings, in which:—

Figure 1 is a vertical section of the meat holder together with the slicing knife and the stand which contains the mechanism for protruding the cooked meat from the holder between each slicing operation;

Figure 2 is a plan view of the holder, and Figure 3 is an inverted plan view thereof with stand $a^7$ attached;

Figure 4 is a side elevation of the meat holder, and the stand on a plane at right angles to Figure 1;

Figure 5 is a sectional view on line C D of Figure 4;

Figure 6 is a plan view of Figure 4 with the meat holder removed;

Figure 7 is a sectional plan view on line A B of Figure 4;

Figure 8 is a half side elevation and half vertical section of the cooking receptacle with the meat holder located in situ therein, and Figure 9 is a plan view of Figure 8.

Referring to these figures I provide a meat holding vessel $a$ of any convenient shape cylindrical for example (Figures 1 to 4). This vessel comprises a body part $a$ of sheet tin or any other suitable material, a bottom member $a^1$ of cast or malleable metal permanently secured thereto, and an external reinforcing member or ring $a^9$ at the upper end, also secured to the body in a permanent manner. The bottom member $a^1$ has a central aperture in it with a central depending boss below and it is also provided with an eye piece which forms one member of the hinge $a^6$ and with a depending catch $a^5$ for the purpose hereinafter mentioned. Inside the body part $a$ a supplementary or false bottom $a^8$ fits exactly and rests upon the bottom $a^1$ thus normally closing the centre aperture therein and preventing any loss of weight through the escape of the meat juices and fat which if permitted would spoil the flavour of the meat. A spigot member integral with this false bottom $a^8$ projects through the centre hole in the bottom end member $a^1$.

The vessel $a$ is filled with meat and a pressure plate $a^2$ which fits the vessel exactly, is placed on top of the meat (Figure 8) the extreme top of the vessel being provided with a removable cover $a^4$ which is secured thereto by set screws engaging the reinforcing ring $a^9$. A pressure screw $a^3$ having an eye $m$ at the top so that it can be turned by a tommy bar is screwed through the lid $a^4$ so as to press against a spigot into the pressure plate $a^2$ and compress the meat into a compact and uniform mass also expel superfluous air.

The vessel $a$ packed with meat is then placed in a cooking receptacle $k$ where it remains for a suitable length of time until the meat is properly cooked. When the cooking operation has been completed the vessel $a$ with the cooked meat inside is taken out of the receptacle $k$ and can be kept for an indefinite period, as the meat so long as it is contained in the vessel $a$ will remain perfectly fresh and fit for food, and will also retain its flavour and juiciness since the loss of juice fat and the like is prevented during the cooking process. When however the meat is required for use the cover $a^4$ is taken off, the pressure plate $a^2$ lifted out and the vessel $a$ with the meat in it, is placed on a stand $d$ and by means of mechanism to be described the meat is moved upwards a distance corresponding to the thickness of the slice to be cut, the upper end of the vessel forming a guide for the slicing knife. Thus it will be seen that between the time the meat is packed in the vessel $a$ for cooking, and the time when the sliced meat is delivered to the consumer, it is not touched by hand.

The cooking receptacle $k$ is considerably larger than the vessel $a$. It is provided with a hinged cover $k^1$ and handles $k^2$ and with legs upon which it stands in an upright position, and it has in connection with it a gas ring or burner $l$ for heating the water in the receptacle $k$. The interior of the receptacle $k$ has a base piece or stand $a^7$ for supporting the vessel $a$ in the receptacle above the bottom thereof. This stand $a^7$ has a centre cavity at the top into which spigots the centre piece which depends from the underside of the vessel $a$, thus holding the vessel in position.

The stand $d$ (Figures 1, 4, 5, 6 and 7) comprises a tubular member which by means of lateral jaws and a clamping screw $d^1$ can be clamped to a counter. Mounted on the upper end of this tubular member $d$ is a table $d^2$ which can be turned about the axis of the said member, and this table is provided with an eye which in connection with the corresponding eye at the bottom of the vessel $a$ and the pin $a^6$ forms a hinge. When it is desired to cut the meat into slices a vessel $a$ containing the cooked meat, is placed upright on the table so as to stand thereon, the pin $a^6$ is inserted and the catch $a^5$ made to engage the opposite edge of table so that the vessel is held in position with the open end at the top ready for the meat to be exuded therefrom far enough to cut off one slice. In the tubular part $d$ is journalled a rack bar $c$ which is moved up intermittently by a pinion $e$ secured to a spindle $f$ journalled in a part of the stand. Secured to this spindle $f$ is a ratchet wheel $g$, and mounted freely on the spindle is the hand lever $g^2$ which is provided with a pawl $g^3$. By pulling the handle $g^4$ in one direction, motion is imparted to the pinion $e$ which lifts the rack bar $c$ and so lifts the false bottom $a^8$ and raises the meat out of the vessel for a definite distance according to the angle through which the ratchet wheel has been turned, so that a slice of the meat can be cut off by the knife blade $b$ which is pivotally mounted on the pin $b^7$.

In order to regulate the thickness of the slices cut off, and thus protect the vendor from cutting off the meat in slices thicker than those to be paid for by the customer, a graduated dial $j$ is bolted to a part of the stand $d$. This is notched at equidistant intervals and each notch is numbered to indicate the various degrees of thickness the slices may be cut. In connection with this dial I freely mount an arm $h$ on the spindle $f$, this arm being provided with a handle $h^1$ and with a spring catch $h^2$, and the hand lever $g^2$ is provided with a finger $g^5$ which enters the curved slot in the dial and projects into the path of the arm $h$. If therefore it is desired to slice off a piece of meat of a definite thickness corresponding to say the numeral 4 on the dial, the operator turns the arm $h$ into such a position that the spring catch will snap into the notch immediately in advance of that numeral, and accordingly the backward and forward movement of the hand level $g^2$ is limited at one end of its stroke by the end of the slot, and at the other end of its stroke by the position into which the arm $h$ has been adjusted into. Each time a piece of meat has been sliced off by the knife, the ratchet wheel is turned a given distance by pulling over the hand lever to the position where it is stopped by the arm thus presenting another portion of the meat to be sliced off by the knife, the other pawl $g^1$ acting as a detent to the ratchet wheel during the return motion of the hand lever $g^2$.

A bracket $b^6$ is removably secured to the reinforcing ring $a^9$ by a set screw $b^4$ which is coupled by a chain to the bracket so that it cannot get lost. The bracket carries the pivot pin $b^7$. At one end the knife blade is bolted by the bolt $b^9$ to the member $b^2$ which is mounted on the pivot pin and secured thereon by the milled nut $b^5$. At the other end the knife blade is bolted at $b^9$ to the member $b^1$ which is provided with a handle $b^3$ by which the knife blade can be oscillated about the axis $b^7$ so as to cut off slices of meat of a thickness corresponding to the extent to which the meat protrudes from the top of the vessel $a$, the top of such vessel acting as a guide for the blade. The false bottom $a^8$ may be provided with a number of short pegs or spikes on its upper surface upon which the meat becomes impaled and which serves to hold the residue of the meat in position while cutting off the last slice or slices. The bracket $b^4$ with its knife $b$ can at any time be removed from the vessel $a$, and the hole $b^{10}$ in the blade is made to take on to the fixed pin $d^3$ so as to prevent the knife and its bracket getting accidentally mislaid.

The mode of operation may be briefly summarized as follows:—The meat having been boned and placed in a vessel $a$, the pressure plate $a^2$ and cover $a^4$ are placed in position and the latter screwed down so as to strongly compress and compact the meat and cause it to entirely fill up the vessel between the pressure plate $a^2$ and the false bottom $a^8$. In this condition the vessel $a$ is brought to the receptacle $k$ which is supplied to a suitable depth with hot water kept at boiling temperature by the burner $l$ and the meat in the vessel $a$ is boiled or cooked by the heat of the water and the steam in the receptacle $k$. When the cooking is completed the vessel $a$ with the cooked meat inside is taken out of the receptacle and can be kept for an indefinite period and any number of these vessels $a$ packed with cooked meat may be kept in stock ready for immediate use as required. When therefore the meat is required, the cover $a^4$ is taken off one of these vessels, the pressure plate $a^2$ lifted out and the vessel $a$ with the meat in, placed upon the stand $d$, the hinge pin $a^6$ is inserted and the spring catch $a^5$ made to catch on to the table $d^2$ so that the vessel $a$ is held firmly in position. The bracket $b^6$ with its knife $b$, is fastened on by the set screw $b^4$, and the arm $h$ set to the position required. To cut off a slice of meat the handle $g^4$ is pulled forward until it abuts against the stop thereby lifting the rack bar $c$ and the false bottom $a^8$ together with the meat resting on it, and causing the latter to protrude from the top of the vessel a distance equal to the thickness of one slice. The handle $b^3$ is now operated so as to cut off a slice from that portion of the compact body of meat that projects from the vessel $a$, the slice being smooth and with an attractive appearance. To cut the next slice the handle $g^4$ is pulled back again and then forwardly and the operation of slicing it again repeated. There is no waste inasmuch as each slice is compact and of full size from the first to the last slice. The hinge $a^6$ enables the vessel $a$ to be tilted towards a customer into the position shown by the dotted lines in Figure 1 so as to exhibit the meat contained within the vessel $a$, the table $d^2$ allowing also of the vessel $a$ to be turned on the axis of the tubular portion of the stand $d^2$. This allows of the vessel being tilted in a direction pointing towards the customer. A prop $b^8$ hinged to the vessel $a$ prevents the vessel being tilted too far. The spigot which projects downward from the false bottom $a^8$ and which enters the central aperture in the table $a^8$ keeps the axis of the meat holding vessel $a$ and the axis of the rack bar $c$ in alignment. The central aperture in the permanent bottom of the vessel $a$ may be threaded inside and arranged to screw on to the stand $a^7$ in the cooking receptacle $k$.

I declare that what I claim is:—

1. An apparatus for cooking and slicing meats comprising, in combination with a slicing knife, a meat compressing vessel the upper edge of which forms a guide for the knife, a cooking receptacle in which the vessel packed with the meat is placed to be cooked or boiled, a stand for supporting the packed vessel when taken out of the cooking receptacle, and means in connection with the stand for raising the meat out of the vessel at the slicing knife end to a definite distance between each slicing operation.

2. In an apparatus for cooking and slicing meats, a meat compressing and holding vessel, the upper part of which forms a guide for the pivoted sliding knife hereafter described, a pivoted sliding knife, means for operating this knife in a plane parallel with the top of the meat holder, a false bottom fitting the interior of the holder, a stand upon which the holder is placed when taken out of the cooking receptacle, mechanism attached thereto for lifting the false bottom and causing the meat to protrude from the top of the vessel between each slicing operation the distance of one slice.

3. In an apparatus for cooking and slicing meats, a meat holder comprising a body with a permanent bottom and removable lid within which body the meat is compressed, a cooking receptacle having a stand therein upon which the holder packed with the meat can be cooked or boiled, a stand for supporting the packed holder when taken out of the cooking receptacle the base of the meat compressing vessel being of such shape that it can either be supported in the cooking receptacle during the operation of cooking the meat or upon the stand during the operation of protruding the meat from the vessel and cutting it up into slices.

4. In an apparatus for cooking and slicing meats, a meat holder comprising a body having a permanent bottom and removable lid within which body the meat is compressed, a cooking receptacle having a stand therein upon which the holder packed with the meat can be cooked, a stand for supporting the packed holder when taken out of the cooking receptacle, the lid of the meat holder made removable, and the slicing knife pivoted on a bracket and operating in a plane parallel with the top of the meat holder and on the line normally abutting against the cover when the latter is in place.

5. In an apparatus for cooking and slicing meat as claimed in claim 1, a meat holder having a false bottom a stand upon which the meat holder is placed when taken out of the cooking receptacle, a rack bar journalled in the stand, means for locking the meat holder thereto, a rod journalled in the stand the upper end of which abuts against the false bottom, and a rack and pinion gear a lever and a ratchet and pawl device for imparting an intermittent lift to the false bottom.

6. In an apparatus for cooking and slicing meats as claimed in claim 2, the means for regulating the lift of the false bottom at each operation of the handle comprising an adjustable stop member which confines the stroke of the handle within limits according to the position the arm is adjusted into.

7. In an apparatus for cooking and slicing meats, a meat holder comprising a body with a permanent bottom and removable lid within which body the meat is compressed, a cooking receptacle having a stand therein upon which the holder packed with the meat can be cooked or boiled, a stand for supporting the packed holder when taken out of the cooking receptacle, the tubular member of the stand combined with a table which can be turned about the axis of the said member and to which the bottom of the meat holder is hinged by a removable hinge pin in such manner as to enable the holder to be held in position on the table or removed therefrom or to be tilted towards a customer to exhibit the meat contained therein.

In witness whereof, I have hereunto signed my name this 31st day of March, 1920, in the presence of two subscribing witnesses.

JOHN GEORGE JONES.

Witnesses:
    HEDA ARMSTRURE,
    J. McLACHLAN.